(12) United States Patent
Kiyosada

(10) Patent No.: US 10,711,149 B2
(45) Date of Patent: Jul. 14, 2020

(54) ACTIVE ENERGY RAY-CURABLE RESIN COMPOSITION FOR THREE-DIMENSIONAL MODEL SUPPORTING MATERIAL

(71) Applicant: KJ CHEMICALS CORPORATION, Tokyo (JP)

(72) Inventor: Toshitsugu Kiyosada, Kumamoto (JP)

(73) Assignee: KJ CHEMICALS CORPORATION, Tokyo (JP)

(*) Notice: Subject to any disclaimer, the term of this patent is extended or adjusted under 35 U.S.C. 154(b) by 22 days.

(21) Appl. No.: 15/533,537

(22) PCT Filed: Jan. 20, 2016

(86) PCT No.: PCT/JP2016/051515
§ 371 (c)(1),
(2) Date: Jun. 6, 2017

(87) PCT Pub. No.: WO2016/121587
PCT Pub. Date: Aug. 4, 2016

(65) Prior Publication Data
US 2018/0291219 A1    Oct. 11, 2018

(30) Foreign Application Priority Data

Jan. 26, 2015 (JP) .................. 2015-012524
Feb. 19, 2015 (JP) .................. 2015-031031

(51) Int. Cl.
| | |
|---|---|
| C09D 11/38 | (2014.01) |
| C09D 11/101 | (2014.01) |
| B33Y 70/00 | (2020.01) |
| C08F 2/44 | (2006.01) |
| B29C 67/00 | (2017.01) |
| C08F 290/06 | (2006.01) |
| C08F 2/50 | (2006.01) |
| C08F 220/58 | (2006.01) |
| C09D 4/00 | (2006.01) |
| C08F 220/06 | (2006.01) |
| B29C 64/40 | (2017.01) |
| C09D 11/106 | (2014.01) |
| C09D 11/107 | (2014.01) |
| B29C 64/112 | (2017.01) |
| B29K 71/00 | (2006.01) |
| B29K 105/00 | (2006.01) |

(52) U.S. Cl.
CPC .............. *C09D 11/38* (2013.01); *B29C 64/40* (2017.08); *B29C 67/00* (2013.01); *B33Y 70/00* (2014.12); *C08F 2/44* (2013.01); *C08F 2/50* (2013.01); *C08F 220/06* (2013.01); *C08F 220/58* (2013.01); *C08F 290/06* (2013.01); *C09D 4/00* (2013.01); *C09D 11/101* (2013.01); *C09D 11/106* (2013.01); *C09D 11/107* (2013.01); *B29C 64/112* (2017.08); *B29K 2071/02* (2013.01); *B29K 2105/0002* (2013.01); *B29K 2995/0062* (2013.01)

(58) Field of Classification Search
CPC ........ C09D 4/00; C09D 11/101; C09D 11/38; C09D 11/106; C09D 11/107; C09D 11/30; C08F 290/06; C08F 220/58; C08F 220/06; C08F 2/44; C08F 220/56; C08F 5/50; B33Y 70/00; B29K 2995/0062
See application file for complete search history.

(56) References Cited

U.S. PATENT DOCUMENTS

| | | | |
|---|---|---|---|
| 5,503,785 A | 4/1996 | Crump et al. | |
| 9,790,382 B2* | 10/2017 | Suzuki | ................. C08F 220/10 |
| 2006/0148949 A1 | 6/2006 | Ono | |
| 2013/0234370 A1 | 9/2013 | Suzuki et al. | |
| 2014/0162016 A1 | 6/2014 | Takeshi et al. | |
| 2015/0232654 A1 | 8/2015 | Sugihara et al. | |
| 2018/0264716 A1* | 9/2018 | Kiyosada | ................ B29C 67/00 |

FOREIGN PATENT DOCUMENTS

| | | |
|---|---|---|
| CN | 103509516 A | 1/2014 |
| EP | 1 595 896 | 11/2005 |
| EP | 2636511 A1 | 9/2013 |
| JP | 2004-255839 | 9/2004 |
| JP | 2005-35299 | 2/2005 |
| JP | 2008-507619 | 3/2008 |

(Continued)

OTHER PUBLICATIONS

Official Communication in Chinese application 2016800046337 dated Dec. 17, 2018 including search report.

(Continued)

Primary Examiner — Sanza L. McClendon
(74) Attorney, Agent, or Firm — Greenblum & Bernstein, P.L.C.

(57) ABSTRACT

An object of the present invention is to provide a shape supporting support material which can be efficiently removed after molding in addition manufacturing and an active energy ray-curable resin composition used for forming the support material. An active energy ray-curable resin composition containing the ionic monomer (A), the nonionic water-soluble monomer (B), the nonpolymerizable compound (C), and the photopolymerization initiator (D), and/or the polyfunctional monomer (E) is used. The support material can be thereby efficiently removed from the formed roughly modeled product. Furthermore, a three-dimensional modeled product having a non-contaminated surface and high molding accuracy can be obtained.

13 Claims, No Drawings

(56) References Cited

FOREIGN PATENT DOCUMENTS

| | | |
|---|---|---|
| JP | 2010-155889 | 7/2010 |
| JP | 2011-5658 | 1/2011 |
| JP | 2011-012240 A | 1/2011 |
| JP | 2011-20412 | 2/2011 |
| JP | 2012-46687 A | 3/2012 |
| JP | 2012-96428 | 5/2012 |
| JP | 2012-111226 | 6/2012 |
| JP | 2014-83744 | 5/2014 |
| JP | 2014-113695 | 6/2014 |
| JP | 2015010164 A | 1/2015 |
| WO | 01/68375 | 9/2001 |
| WO | 2004/074331 | 9/2004 |
| WO | 2014/051046 | 4/2014 |

OTHER PUBLICATIONS

First Chinese Office Action issued in Chinese Patent Application No. 201680004633.7 dated Aug. 22, 2018.
Second European Office Action issued in European Patent Application No. 16743191.5 dated Jul. 19, 2018.
Notification of Reasons for Refusal from JP Application No. 2016-535751 dated Jul. 11, 2016.
Extended European Search Report from Application No. EP 16743191.5 dated Jan. 4, 2018.
International Search Report issued in Patent Application No. PCT/JP2016/051515, dated Mar. 29, 2016.

\* cited by examiner

US 10,711,149 B2

ACTIVE ENERGY RAY-CURABLE RESIN COMPOSITION FOR THREE-DIMENSIONAL MODEL SUPPORTING MATERIAL

TECHNICAL FIELD

The present invention relates to an active energy ray-curable resin composition used for forming a shape supporting support material in addition manufacturing and a support material formed from the composition. The present invention also relates to an optical three-dimensional molding method using the support material, particularly to an inkjet type optical three-dimensional molding method. Furthermore, the present invention relates to a three-dimensional molded product obtained by these manufacturing methods.

BACKGROUND ART

An addition manufacturing technique is a technique for obtaining a desired three-dimensional molded product in the following manner. According to this technique, a thermoplastic resin, a photocurable resin, a powdered resin, a powdered metal, or the like is fused and cured based on three-dimensional shape data by melt extrusion, inkjet, laser light, an electron beam, or the like, and is laminated in a thin film form. A molded product is obtained directly from the shape data, and a complicated shape such as a hollow shape or a meshed shape can be integrally molded. Therefore, a field of application has been expanded to medical and aircraft industries, an industrial robot, and the like in addition to creation of a small lot or custom made test model.

In order to obtain a three-dimensional molded product, an addition manufacturing apparatus generally called a 3D printer is used. Specifically, an inkjet ultraviolet curing type using a photocurable resin such as acrylic, and a heat melting lamination type using a thermoplastic resin such as an acrylonitrile-butadiene-styrene resin are known. In addition to these types, powder molding type and optical molding type 3D printers are known.

According to the addition manufacturing technique, a three-dimensional molded product having a complicated shape can be formed. However, when a hollow structure is manufactured, a three-dimensional molded product is deformed by its own weight. In order to prevent this deformation, a shape supporting support is required. In a case of a powder molding type in which a powder raw material is bonded or fused, an unbonded or unfused powder acts as a support. After molding, the unbonded or unfused powder is scraped off, and a three-dimensional molded product can be thereby obtained. On the other hand, in an inkjet type in which a photocurable resin is gradually cured, or a heat melting lamination type in which a thermoplastic resin is melted, extruded, and laminated, it is necessary to form a three-dimensional molded product formed of a model material and a support formed of a support material almost at the same time. Therefore, it is necessary to provide a step of removing a support material from a three-dimensional molded product after molding.

However, removing a support material after molding is not easy work at all. The support material is fused, adheres, or sticks to an intended three-dimensional molded product. Therefore, in work of peeling the support material from the molded product, a means such as peeling the support material manually using a spatula, a brush, or the like, or blowing off the support material with a water jet is usually used. However, there is a risk of breakage of the three-dimensional molded product. Therefore, necessity of careful work has been a large burden.

Therefore, as the support material, a thermoplastic resin, a hot melt wax, a material which can be dissolved in water or an organic solvent, a water-swellable gel, or the like is used. A separation method utilizing heating, dissolution, a chemical reaction, power washing such as hydraulic washing, electromagnetic wave irradiation, a thermal expansion difference, or the like according to a property of a support material has been proposed (Patent Literatures 1 and 2). Specifically, use of a resin which can be easily peeled from a model material (Patent Literatures 3 and 4), melt-removing a support material by heat using a wax as the support material (Patent Literature 5), a means for dissolving or dispersing a support material in an alkali, water, or an organic solvent (Patent Literatures 6 to 11), and a means for removing a support material using an electrolyte solution such as tetramethylammonium hydroxide as a washing liquid under stirring or energizing (Patent Literature 12) have been proposed.

However, also in these support materials, it is extremely difficult to efficiently remove a portion with which details are clogged. In addition, when a method for melt-removing a wax or the like by heat is used, an oily residue adheres to a surface of a three-dimensional molded product after removal. Therefore, finishing work for the three-dimensional molded product such as wiping is required. Furthermore, a wax penetrates into the model material by heating. As a result, a surface state of the three-dimensional molded product is deteriorated disadvantageously.

On the other hand, even when a support material is removed by dissolving, dispersing, or swelling the support material in an alkaline aqueous solution, water, or an organic solvent, the support material which has been collapsed due to dissolution, dispersion, or swelling adheres to a three-dimensional molded product immersed in a washing tank. As a result, a surface of the three-dimensional molded product is contaminated. Therefore, similarly, finishing work for the three-dimensional molded product such as wiping a surface is required. In addition, it is necessary to provide a treatment step or a collecting step suitable for each of an alkaline aqueous solution, an organic solvent, and an acidic aqueous solution generated by removal of a support material containing an acidic substance after removal of the support material.

Furthermore, in an inkjet printing type using an active energy ray, molding accuracy of an interface is lowered due to a compatibilized or mixed state generated near a contact surface before curing by a support material and a model material. As a result, finishing accuracy of a three-dimensional molded product is lowered, for example, a surface of a contact portion is roughened after removal of the support material.

Under such circumstances, as a three-dimensional optical molding support material, development of a support material capable of being removed easily, requiring no finishing step after removal, and capable of acquiring a highly accurate three-dimensional molded product has been desired.

CITATION LIST

Patent Literature

PATENT LITERATURE 1: JP 2005-035299 A
PATENT LITERATURE 2: JP 2012-096428 A
PATENT LITERATURE 3: U.S. Pat. No. 5,503,785

PATENT LITERATURE 4: WO 2001-068375
PATENT LITERATURE 5: JP 2004-255839 A
PATENT LITERATURE 6: JP 2008-507619 W
PATENT LITERATURE 7: JP 2011-005658 W
PATENT LITERATURE 8: JP 2010-155889 A
PATENT LITERATURE 9: JP 2012-111226 A
PATENT LITERATURE 10: JP 2014-083744 A
PATENT LITERATURE 11: WO 2014-051046
PATENT LITERATURE 12: JP 2011-020412 A

SUMMARY OF THE INVENTION

Problems to be Solved by the Invention

An object of the present invention is to provide a support material capable of being removed efficiently at a low temperature in a short time only by immersing a roughly molded product supported by the support material in a washing liquid, and capable of acquiring a three-dimensional molded product having a high molding accuracy without requiring a finishing step. In addition, an object of the present invention is to provide an active energy ray-curable resin composition used for forming the support material. Furthermore, an object of the present invention is to provide a three-dimensional optical molding method capable of acquiring a three-dimensional molded product with a high efficiency and a high accuracy using a support material obtained by curing the active energy ray-curable resin composition, and a molded product obtained thereby.

Solution to the Problems

The present inventors made intensive studies in order to solve the above problems. As a result, the present inventors have found that the above problems are solved and an object can be achieved by using a cured product of an active energy ray-curable resin composition containing an ionic monomer as a support material. The present invention has been thereby achieved.

That is, the present invention provides:
(1) an active energy ray-curable resin composition for a three-dimensional molding support material, containing 1.0% by mass or more of an ionic monomer (A);
(2) the active energy ray-curable resin composition described in (1), containing 1.0 to 30.0% by mass of the ionic monomer (A), 2.0 to 60.0% by mass of a non-ionic water-soluble monomer (B), 25.0 to 80.0% by mass of a non-polymerizable compound (C), and 0.1 to 5.0% by mass of a photopolymerization initiator (D);
(3) the active energy ray-curable resin composition described in (1) or (2), containing 1.0 to 30.0% by mass of the ionic monomer (A), 10.0 to 60.0% by mass of the non-ionic water-soluble monomer (B), 25.0 to 60.0% by mass of the non-polymerizable compound (C), and 0.1 to 5.0% by mass of the photopolymerization initiator (D), in which a cured product obtained by irradiation with an active energy ray is water-soluble or water-dispersible;
(4) the active energy ray-curable resin composition described in (1) or (2), containing 1.0 to 30.0% by mass of the ionic monomer (A), 2.0 to 50.0% by mass of the non-ionic water-soluble monomer (B), 40.0 to 80.0% by mass of the non-polymerizable compound (C), 0.1 to 5.0% by mass of the photopolymerization initiator (D), and 0.5 to 5.0% by mass of a polyfunctional unsaturated monomer (E), in which a cured product obtained by irradiation with an active energy ray is water-swellable;
(5) the active energy ray-curable resin composition described in (4), in which the polyfunctional unsaturated monomer (E) is polyurethane (meth)acrylamide;
(6) the active energy ray-curable resin composition described in any one of (1) to (5), in which the ionic monomer (A) is a cationic monomer (a1) and/or an anionic monomer (a2);
(7) the active energy ray-curable resin composition described in any one of (1) to (6), in which the ionic monomer (A) is a compound represented by the following general formula (1),

[Chemical formula 1]

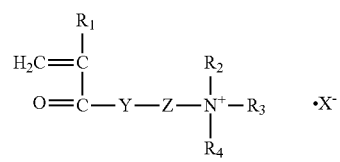

General formula (1)

(In the formula, $R_1$ represents a hydrogen atom or a methyl group. $R_2$ and $R_3$ each independently represent an alkyl group having 1 to 3 carbon atoms. $R_2$ and $R_3$ may be the same as or different from each other. $R_4$ represents an alkyl group, an alkenyl group, or a benzyl group having 1 to 3 carbon atoms. Y represents an oxygen atom or NH. Z represents an alkylene group having 1 to 3 carbon atoms. $X^-$ represents an anion);
(8) the active energy ray-curable resin composition described in any one of (1) to (7), in which the non-ionic water-soluble monomer (B) is N-substituted (meth)acrylamide;
(9) the active energy ray-curable resin composition described in any one of (1) to (8), in which the non-ionic water-soluble monomer (B) is N-(2-hydroxyethyl) acrylamide and/or N-acryloylmorpholine;
(10) the active energy ray-curable resin composition described in any one of (1) to (9), in which the non-polymerizable compound (C) is water and/or a non-polymerizable water-soluble organic compound;
(11) the active energy ray-curable resin composition described in any one of (1) to (10), in which the non-polymerizable compound (C) is a compound having an alkylene glycol structure;
(12) an ink-jet ink composition for three-dimensional molding, containing the active energy ray-curable resin composition described in any one of (1) to (11); and
(13) a support material obtained by curing the active energy ray-curable resin composition described in any one of (1) to (11) by irradiation with an active energy ray.

Effects of the Invention

According to the present invention, a support material is formed by curing an active energy ray-curable resin composition containing an ionic monomer by irradiation with an active energy ray simultaneously with or immediately after molding of the active energy ray-curable resin composition by addition manufacturing. A roughly molded product in which the support material and a model material supported by the support material are formed integrally is obtained. By immersing the resulting roughly molded product in a washing liquid such as water, the support material is dissolved or dispersed in the washing liquid. Alternatively, the support material is swelled due to the washing liquid, and is released from the model material. The support material can be thereby removed easily from the three-dimensional molded product. In addition, the active energy ray-curable resin composition has a high polarity because of containing the ionic monomer. Therefore, a phase separation property between the support material and the curable resin composition for the model material is high. Therefore, the three-dimensional molded product having a not-contaminated surface and a high molding accuracy can be provided.

DESCRIPTION OF THE EMBODIMENTS

Hereinafter, the present invention will be described in detail.

The ionic monomer (A) used in the present invention is a cationic monomer (a1) having at least one cationic group selected from the group consisting of an ammonium salt, an imidazolium salt, a choline salt, a sulfonium salt, a pyrazolium salt, an oxazolium salt, a pyridinium salt, a pyrrolidinium salt, a phosphonium salt, and the like, and an ethylenically unsaturated bond in one molecule thereof, an anionic monomer (a2) having at least one anionic group selected from the group consisting of a calboxylate, a sulfonate, a phosphate, and the like, and an ethylenically unsaturated bond in one molecule thereof, or a betaine-type monomer (a3) having at least one of the cationic groups described above, at least one of the anionic groups described above, and an ethylenically unsaturated bond group in one molecule thereof. One of these ionic monomers may be used singly. Alternatively, two or more ionic monomers thereof may be used in combination.

Specific examples of a cation as the cationic monomer (a1) used in the present invention include ammonium, imidazolium, choline, sulfonium, pyrazolium, oxazolium, pyridinium, pyrrolidinium, and phosphonium having an ethylenically unsaturated bond. A paired anion thereof is at least one selected from a halogen ion such as $Cl^-$, $Br^-$, or $I^-$, and an inorganic acid anion and an organic acid anion such as $OH^-$, $CH_3COO^-$, $NO_3^-$, $ClO_4^-$, $PF_6^-$, $BF_4^-$, $HSO_4^-$, $CH_3SO_3^-$, $CH_3SO^-$, $CH_3C_6H_6SO_3^-$, $(CF_3SO_2)_2N^-$, or $SCN^-$.

Examples of the ethylenically unsaturated bond contained in the cationic monomer (a1) used in the present invention include a vinyl group, an allyl group, an acrylate group, a methacrylate group, an acrylamide group, and a methacrylamide group. The cationic monomer (a1) is a compound preferably represented by the following general formula (1) from a viewpoint of active energy ray curability and excellent copolymerizability with another copolymerizable monomer. (In the formula, $R_1$ preferably represents a hydrogen atom or a methyl group. $R_2$ and $R_3$ each independently represent an alkyl group having 1 to 3 carbon atoms. $R_2$ and $R_3$ may be the same as or different from each other. $R_4$ represents an alkyl group having 1 to 3 carbon atoms or a benzyl group. Y represents an oxygen atom or NH. Z represents an alkylene group having 1 to 3 carbon atoms. $X^-$ represents a halogen ion such as $Cl^-$, $Br^-$, or $I^-$, or an anion such as $OH^-$, $CH_3CPP^-$, $NO_3^-$, $ClO_4^-$, $PF_6^-$, $BF_4^-$, $HSO_4^-$, $CH_3SO_3^-$, $CF_3SO_3^-$, $CH_3C_6H_6SO_3^-$, $C_4F_9SO_3^-$, $(CF_3SO_2)_2N^-$, or $SCN^-$.) (2-ethyl acrylate) trimethylammonium methylsulfonate and (3-acrylamidopropyl) trimethylammonium p-toluenesulfonate are more preferable because of high compatibility with the nonionic water-soluble monomer (B) and capability of suppressing corrosion of a metal part of an addition molding apparatus or a washing tank.

[Chemical formula 2]

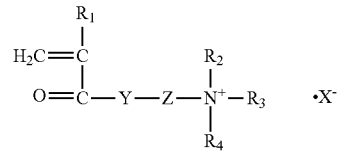

General formula (1)

Specific examples of an anion as the anionic monomer (a2) used in the present invention include a (meth)acrylate ion, a (meth)acrylate ethyl carboxylate ion, a (meth)acrylate ethyl succinate ion, a (meth)acrylate ethyl phthalate ion, a (meth)acrylate ethyl hexahydrophthalate ion, a maleate ion, a tetrahydrophthalate ion, an itaconate ion, a (meth)acrylate ethyl sulfonate ion, a 2-acrylamide-2-methyl propane sulfonate ion, a vinyl carboxylate ion, a vinyl sulfonate ionn, a (meth)acrylate ethyl phosphate ion, and vinyl phosphate ion. For example, a paired cation thereof is at least one selected from an inorganic cation such as $Li^+$, $Na^+$, $K^+$, $Ca_2^+$, $Mg_2^+$, and an organic cation such as ammonium, imidazolium, choline, sulfonium, oxazolium, pyrazolium, pyridinium, pyrrolidinium, or phosphonium.

Specific examples of the betaine-type monomer (a3) used in the present invention include a carboxybetaine type monomer such as (meth)acryloyloxyalkyl-N,N-dialkylammonium-ω-N-alkylcarboxybetaine or (meth)acrylamidooxyalkyl-N,N-dialkylammonium-ω-N-alkylcarboxybetaine; a sulfobetaine type monomer such as (meth)acryloyloxyalkyl-N,N-dialkylammonium-ω-N-alkylsulfobetaine or (meth)acrylamidooxyalkyl-N,N-dialkylammonium-ω-N-alkylsulfobetaine; a phosphobetaine type monomer such as (meth)acryloyloxyalkyl-N,N-dialkylammonium-ω-N-alkylphosphobetaine or (meth)acrylamidooxyalkyl-N,N-dialkylammonium-ω-N-alkylphosphobetaine; and an imidazolinium betaine type monomer such as 2-(meth)acryloyloxy-N-methylcarboxy-N-hydroxyethylimidazolinium betaine. One betaine type monomer of these monomers may be used singly, or two or more betaine type monomers thereof may be used in combination.

One kind of the cationic monomer (a 1), the anionic monomer (a2), and the betaine type monomer (a3) which are ionic monomers may be used singly. Two or more kinds thereof may be used in combination. The cationic monomer (a 1) and the anionic monomer (a2) are more preferable from a viewpoint of keeping a balance among compatibility with another component in a support material, such as the nonionic water-soluble monomer (B), copolymerizability, and incompatibility with a resin composition forming a model material. The cationic monomer (a1) is more preferable.

The content of the ionic monomer (A) in the present invention is 1.0% by mass or more with respect to the entire active energy ray-curable resin composition. When the content is 1.0% by mass or more, a cured support material suitably has excellent dissolubility and dispersibility in a washing liquid, an excellent swelling property in a washing liquid, or excellent separability from a model material. The content of the ionic monomer (A) is more preferably from 1.0 to 30.0% by mass. When the content is 30.0% by mass or less, an obtained support material can suppress bleeding out of the non-polymerizable compound (C). A step of removing a support material by dissolution or dispersion has a sufficient dissolution rate and dispersion rate. A step of removing a support material by swelling peeling suppresses a dissolution ratio in a washing liquid and can maintain a sufficient swelling ratio. Therefore, the content is preferably 30.0% by mass or less. The content is more preferably from 5.0 to 20.0% by mass.

Examples of the nonionic water-soluble monomer (B) used in the present invention include water-soluble hydroxyalkyl (meth)acrylate, water-soluble polyalkylene glycol (meth)acrylate, water-soluble alkoxypolyalkylene glycol (meth)acrylate, glycerol mono(meth)acrylate, tetrahydrofurfuryl (meth)acrylate, and water-soluble N-substituted (meth) acrylamide. In the present invention, being water-soluble means that the solubility in water (25° C.) is 5 (g/100 g) or more. One of these nonionic water-soluble monomers may be used singly, or two or more thereof may be used in combination.

Examples of the water-soluble hydroxyalkyl (meth)acrylate used in the present invention include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 5-hydroxypentyl (meth) acrylate, and 6-hydroxyhexyl (meth)acrylate.

Examples of the water-soluble polyalkylene glycol (meth) acrylate used in the present invention include diethylene glycol (meth)acrylate, triethylene glycol (meth)acrylate, polyethylene glycol (meth)acrylate, dipropylene glycol (meth)acrylate, tripropylene glycol (meth)acrylate, polypropylene glycol (meth)acrylate, and polyethylene glycol polypropylene glycol (meth)acrylate.

Examples of the water-soluble alkoxypolyalkylene glycol (meth)acrylate used in the present invention include methoxydiethylene glycol (meth)acrylate, methoxytriethylene glycol (meth)acrylate, methoxypolyethylene glycol (meth)acrylate, methoxydipropylene glycol (meth)acrylate, methoxytripropylene glycol (meth)acrylate, methoxypolypropylene glycol (meth)acrylate, and methoxypolyethylene glycol polypropylene glycol (meth)acrylate.

Examples of the water-soluble N-substituted (meth)acrylamide used in the present invention include N-alkyl (meth) acrylamide and N,N-dialkyl (meth)acrylamide having an alkyl group with 1 to 3 carbon atoms introduced, N-(hydroxyalkyl) (meth)acrylamide, N,N-di(hydroxyalkyl) (meth)acrylamide, and N-hydroxyalkyl-N-(4-hydroxyphenyl) (meth)acrylamide having a hydroxyalkyl group with 1 to 6 carbon atoms introduced, N-alkyl-N-hydroxyalkyl (meth)acrylamide having a hydroxyalkyl group with 1 to 6 carbon atoms and an alkyl group with 1 to 6 carbon atoms introduced, N-alkoxyalkyl (meth)acrylamide and N,N-di (alkoxyalkyl) (meth)acrylamide having an alkoxyalkyl group formed of an alkoxy group with 1 to 6 carbon atoms and an alkylene group with 1 to 6 carbon atoms introduced, and N-alkyl-N-alkoxyalkyl (meth)acrylamide, N-hydroxyphenyl (meth)acrylamide, and N-(meth)acryloyl morpholine having an alkoxyalkyl group formed of an alkoxy group with 1 to 6 carbon atoms and an alkylene group with 1 to 6 carbon atoms, and an alkyl group with 1 to 6 carbon atoms introduced.

As the nonionic water-soluble monomer (B) used in the present invention, an N-substituted (meth)acrylamide is preferable due to a large solubility in water and high curability by irradiation with an active energy ray. N-acryloyl morpholine (skin primary irritation index PH=0.5) and N-(2-hydroxyethyl) acrylamide (PH=0.0) are particularly preferable due to easy handling because of high safety due to low skin irritation.

The content of the nonionic water-soluble monomer (B) of the present invention is preferably from 2.0 to 60.0% by mass with respect to the entire active energy ray-curable resin composition. When the content is 2.0% by mass or more, bleeding out of the non-polymerizable compound (C) from a cured support material is suppressed. The cured support material suitably has excellent dissolubility and dispersibility in a washing liquid, an excellent swelling property in a washing liquid, or excellent separability from a model material. When the polyfunctional unsaturated monomer (E) is not contained, the content of (B) is more preferably 10.0% by mass or more because sufficient curability is exhibited with respect to an active energy ray and the nonpolymerizable compound (C) does not bleed out. On the other hand, when the content is 60.0% by mass or less, foaming does not easily occur because an obtained support material has a low curing shrinkage ratio and a small amount of heat generation during curing. As a result, a three-dimensional molded product can be manufactured with high accuracy. Therefore, the content is preferably 60.0% by mass or less. When the polyfunctional unsaturated monomer (E) is contained, the content of (B) is more preferably 50.0% by mass or less from a viewpoint of easiness of controlling heat generation during curing and a curing shrinkage ratio.

The non-polymerizable compound (C) used in the present invention is not particularly limited as long as being a non-polymerizable compound which is compatible with the ionic monomer (A) and the nonionic water-soluble monomer (B) but does not react therewith. Examples of the non-polymerizable compound (C) include an alkylene glycol, a polyalkylene glycol, a glycol ether, a glycol ester, a carboxylate, a ketone, water, a liquid polyolefin, a liquid polyolefin derivative, a liquid polyester, a liquid polycarbonate, and an ionic liquid. One of these nonpolymerizable compounds can be used singly, or two or more thereof can be used in combination.

A support material obtained by curing the active energy ray-curable resin composition is removed by dissolving or dispersing the support material in a washing liquid such as water or swelling the support material in a washing liquid. The non-polymerizable compound (C) is preferably water and/or a non-polymerizable water-soluble organic compound from this viewpoint. In the present invention, being water-soluble means having a solubility (25° C.) of 5 (g/100 g) or more in water.

Examples of the non-polymerizable water-soluble organic compound used in the present invention include water-soluble alkylene glycol, dialkylene glycol, trialkylene glycol, polyalkylene glycol, alkylene glycol monoalkyl ether, dialkylene glycol monoalkyl ether, trialkylene glycol monoalkyl ether, polyalkylene glycol monoalkyl ether, alkylene glycol dialkyl ether, dialkylene glycol dialkyl ether, trialkylene glycol dialkyl ether, polyalkylene glycol dialkyl ether, alkylene glycol monoalkyl ether acetate, dialkylene glycol monoalkyl ether acetate, trialkylene glycol monoalkyl ether acetate, and polyalkylene glycol monoalkyl ether acetate, having an alkylene group with 2 to 4 carbon atoms, an alkyl group with 1 to 4 carbon atoms, and the like.

The content of the non-polymerizable compound (C) used in the present invention is from 25.0 to 80.0% by mass with respect to the entire active energy ray-curable resin composition. When the content is 25.0% by mass or more, the active energy ray-curable resin composition has a low viscosity and excellent operability. In addition, a three-dimensional molded product can be manufactured with high accuracy because an obtained support material has a low curing shrinkage ratio. Therefore, the content is preferably 25.0% by mass or more. When the content is 80% by mass or less, bleeding out of the non-polymerizable compound (C) is suppressed. In addition, a cured product obtained by polymerization with an active energy ray has sufficiently satisfied tensile strength, hardness, elasticity, and the like, and exhibits sufficient performance as a support. Therefore, the content is preferably 80% by mass or less. Furthermore, when the cured product is dissolved or dispersed in a washing liquid, the content of the non-polymerizable compound (C) is more preferably from 25.0 to 60.0% by mass, and still more preferably from 35.0 to 50.0% by mass. When the cured product is swollen in a washing liquid, the content of the non-polymerizable compound (C) is more preferably from 40.0 to 80.0% by mass, and still more preferably from 50.0 to 70.0% by mass because a large swelling ratio can be maintained.

The photopolymerization initiator (D) used in the present invention can be selected appropriately from ordinary photopolymerization initiators such as an acetophenone type, a benzoin type, a benzophenone type, an α aminoketone type, a xanthone type, an anthraquinone type, an acylphosphine oxide type, and a polymer photoinitiator type. Examples of the acetophenone include diethoxyacetophenone, 2,2-dimethoxy-1,2-diphenylethan-1-one, 2-hydroxy-2-methyl-1-phenylpropan-1-one, 1-(4-isopropylphenyl)-2-hydroxy-2-methylpropan-1-one, 4-(2-hydroxyethoxy)-phenyl-(2-hydroxy-2-propyl) ketone, 1-hydroxycyclohexyl phenyl ketone, and 2-methyl-1-(4-methylthiophenyl)-2-morpholinopropane-1. Examples of the benzoin include benzoin, α-methylbenzoin, α-phenylbenzoin, α-allylbenzoin, α-benzoylbenzoin, benzoin methyl ether, benzoin ethyl ether, benzoin isopropyl ether, benzoin isobutyl ether, and benzyl dimethyl ketal. Examples of the benzophenone include benzophenone, benzoylbenzoic acid, and methyl benzoylbenzoate. Examples of the α-aminoketone include 2-methyl-1-(4-methylthiophenyl)-2-(4-morpholinyl)-1-propanone, 2-benzyl-2-(dimethylamino)-1-(4-(4-morpholinyl) phenyl)-1-butanone, and 2-(dimethylamino)-2-(4-methylphenyl) methyl-1-(4-(4-morpholinyl) phenyl)-1-butanone. Examples of the xanthone include xanthone and thioxanthone. Examples of the anthraquinone include anthraquinone, 2-methylanthraquinone, and 2-ethylanthraquinone. Examples of the acylphosphine oxide include bis(2,4,6-trimethylbenzoyl)-phenylphosphine oxide and 2,4,6-trimethylbenzoyl-diphenylphosphine oxide. Examples of the polymer photoinitiator include a polymer of 2-hydroxy-2-methyl-1-(4-(1-methylvinyl) phenyl) propan-1-one. One of these photopolymerization initiators can be used, or two or more thereof can be used in combination.

The content of the photopolymerization initiator (D) used in the present invention is preferably from 0.1 to 5.0% by mass with respect to the entire active energy ray-curable resin composition. When the content is 0.1% by mass or more, the active energy ray-curable resin composition causes a sufficient polymerization reaction by irradiation with an active energy ray. Therefore, the amount of a residual monomer in an obtained support material is small. In addition, a cured product has excellent tensile strength, hardness, elasticity and the like. Furthermore, bleeding out of the non-polymerizable compound (C) can be suppressed. Therefore, the content is preferably 0.1% by mass or more. When the content is 5% by mass or less, a pot life of the active energy ray-curable resin composition is long, and therefore a trouble such as gelation during storage does not occur. Therefore, the content is preferably 5% by mass or less, and more preferably from 0.5 to 3% by mass.

As the polyfunctional unsaturated monomer (E) used in the present invention, a bifunctional monomer and a trifunctional or higher functional monomer can be used. Specific examples of the bifunctional monomer include an alkylene glycol di(meth)acrylate, a polyalkylene glycol di(meth)acrylate, a polyester di(meth)acrylate, a polycarbonate di(meth)acrylate, a polyurethane di(meth)acrylate, and a polyurethane (meth)acrylamide. Examples of the trifunctional or higher functional monomer include pentaerythritol tri(meth)acrylate, pentaerythritol tetra(meth)acrylate, trimethylolpropane tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerol polyglycidyl ether poly(meth)acrylate, isocyanuric acid ethylene oxide modified tri(meth)acrylate, ethylene oxide modified dipentaerythritol penta(meth)acrylate, ethylene oxide modified dipentaerythritol hexa(meth)acrylate, ethylene oxide modified pentaerythritol tri(meth)acrylate, ethylene oxide modified pentaerythritol tetra(meth)acrylate, and succinic acid modified pentaerythritol tri(meth)acrylate. In particular, a polyurethane (meth)acrylamide is preferable because of high curability with respect to an active energy ray. Two or more kinds of these polyfunctional unsaturated monomers (E) can be used in combination.

Examples of the alkylene glycol di(meth)acrylate include ethylene glycol di(meth)acrylate, propylene glycol di(meth)acrylate, neopentyl glycol di(meth)acrylate, 3-methyl-1,5-pentanediol di(meth)acrylate, 1,6-hexanediol di(meth)acrylate, 1,9-nonanediol di(meth)acrylate, 2-n-butyl-2-ethyl-1,3-propanediol di(meth)acrylate, and dimethylol tricyclodecane di(meth)acrylate.

Examples of the polyalkylene glycol di(meth)acrylate include diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, di(neopentyl glycol) di(meth)acrylate, tri(neopentyl glycol) di(meth)acrylate, poly(neopentyl glycol) di(meth)acrylate, di(3-methyl-1,5-pentanediol) di(meth)acrylate, tri(3-methyl-1,5-pentanediol) di(meth)acrylate, poly(3-methyl-1,5-pentanediol) di(meth)acrylate, and polyethylene glycol polypropylene glycol di(meth)acrylate.

A polyester di(meth)acrylate has an ester bond between (meth)acrylic acid and a polyester polyol having a polyester skeleton in a molecule thereof and having hydroxy groups at both ends or side chains thereof. Examples of a polyvalent carboxylic acid component of the polyester polyol include terephthalic acid, isophthalic acid, succinic acid, adipic acid, azelaic acid, sebacic acid, and dodecanedioic acid. Examples of a diol component include ethylene glycol, 1,2-propylene glycol, 1,3-propylene glycol, 1,4-butanediol, 1,5-pentanediol, 1,6-hexanediol, 1,4-cyclohexane dimethanol, 3-methyl-1,5-pentanediol, 1,9-nonanediol, neopentyl glycol, and 2-ethyl-2-butyl-1,3-propanediol.

A polycarbonate di(meth)acrylate has an ester bond between (meth)acrylic acid and a polycarbonate polyol having a carbonate skeleton in a molecule thereof and having hydroxy groups at both ends or side chains thereof. Examples of a carbonyl component of the polycarbonate polyol include phosgene, chloroformate, dialkyl carbonate, diaryl carbonate, and alkylene carbonate. Examples of a diol component include ethylene glycol, 1,2-propylene glycol, 1,3-propylene glycol, 1,4-butanediol, 1,5-pentanediol, 1,6-hexanediol, 1,4-cyclohexane dimethanol, 3-methyl-1,5-pentanediol, 1,9-nonanediol, neopentyl glycol, and 2-ethyl-2-butyl-1,3-propanediol.

A polyurethane di(meth)acrylate is obtained by an addition reaction among an alcohol compound having one or more hydroxy groups in a molecule thereof, a polyisocyanate compound having two or more isocyanate groups in one molecule thereof, and a (meth)acrylate compound having a hydroxy group. A synthesis method therefor is not particularly limited. A polyurethane di(meth)acrylate can be synthesized by a known urethanization reaction technique.

A polyurethane (meth)acrylamide is obtained by an addition reaction with an alcohol compound having one or more hydroxy groups in the molecule thereof, a polyisocyanate compound having two or more isocyanate groups in one molecule thereof, and a (meth)acrylate compound having a hydroxy group. A synthesis method therefor is not particularly limited. A polyurethane (meth)acrylamide can be synthesized by a known urethanization reaction technique.

Examples of the alcohol compound having one or more hydroxy groups in a molecule thereof include ethylene glycol, 1,2-propylene glycol, 1,3-propylene glycol, 1,2-butylene glycol, 1,3-butylene glycol, 1,4-butylene glycol, 1,5-pentane glycol, 2-methyl-1,3-propylene glycol, 2-methyl-1,4 butylene glycol, 1,6-hexanediol, 3-methyl-1,5-pentanediol, 1,9-nonanediol, neopentyl glycol, 2-ethyl-2-butyl-1,3-propanediol, glycerol, polyethylene glycol, polypropylene glycol, polytetramethylene glycol, polymethyl pentane glycol, polyhexamethylene glycol, polyglycerol, polybutadiene polyol, hydrogenated polybutadiene polyol, polyisoprene polyol, hydrogenated polyisoprene polyol, polyester polyol, and polycarbonate polyol, having one or more hydroxy groups at an end or a side chain of a main chain skeleton thereof. One of these polyols can be used singly, or two or more thereof can be used in combination. The non-polymerizable compound (C) preferably has an alkylene glycol structure. Therefore, ethylene glycol, polyethylene glycol, polypropylene glycol, polypropylene glycol, and the like having an alkylene glycol structure are preferable because a urethane (meth)acrylamide is highly compatible with a non-polymerizable compound when these compounds are used.

Examples of the polyisocyanate compound having two or more isocyanate groups in one molecule thereof include an aliphatic isocyanate such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisononate, 1,3-butylene diisocyanate, 2,4,4-trimethylhexamethylene diisocyanate, or 2,2,4-trimethylhexamethylene diisocyanate; an aromatic isocyanate such as 1,3-phenylene diisocyanate, 1,4-phenylene diisocyanate, 2,4-tolylene diisocyanate, 2,6-tolylene diisocyanate, 4,4'-diphenylmethane diisocyanate, 2,4-diphenylmethane diisocyanate, or xylylene diisocyanate; an alicyclic isocyanate such as cyclopentylene diisocyanate, cyclohexylene diisocyanate, isophorone diisocyanate, 4,4'-dicyclohexyl methane diisocyanate, methyl cyclohexylene diisocyanate, 2,5-norbornane diisocyanate, or 2,6-norbornane diisocyanate, and adduct type, isocyanurate type, and buret type multimers thereof. One of these polyisocyanates can be used singly, or two or more thereof can be used in combination.

Examples of the (meth)acrylate compound having a hydroxy group used in the present invention include hydroxyalkyl (meth)acrylate and 4-hydroxyphenyl (meth) acrylate having a hydroxyalkyl group with 1 to 6 carbon atoms introduced, and dialkylene glycol (meth)acrylate, trialkylene glycol (meth)acrylate, polyalkylene glycol (meth)acrylate, glycerol mono (meth)acrylate, and glycerol di(meth)acrylate having an alkylene glycol group with 1 to 6 carbon atoms introduced.

Examples of the (meth)acrylamide compound having a hydroxy group used in the present invention include (N-hydroxyalkyl (meth)acrylamide, N,N-di(hydroxyalkyl)(meth) acrylamide, and N-hydroxyalkyl-N-(4-hydroxyphenyl) (meth)acrylamide having a hydroxyalkyl group with 1 to 6 carbon atoms introduced, and N-alkyl-N-hydroxyalkyl (meth)acrylamide, N-alkyl-N-(4-hydroxyphenyl) (meth) acrylamide, 4-hydroxyphenyl (meth)acrylamide, and N,N-di(4-hydroxyphenyl) (meth)acrylamide having a hydroxyalkyl group with 1 to 6 carbon atoms and an alkyl group with 1 to 6 carbon atoms introduced. In particular, N-(2-hydroxyethyl) acrylamide is more preferable due to easy handling because of high safety due to high curability and low skin irritation (PH=0).

The use amount of the polyfunctional unsaturated monomer (E) is preferably from 0.5 to 5.0% by mass with respect to the entire active energy ray-curable resin composition. When the use amount is 0.5% by mass or more, a cured product obtained by polymerizing the active energy ray-curable resin composition by irradiation with an active energy ray has excellent tensile strength, hardness, elasticity, and the like. Bleeding out of the non-polymerizable compound (C) can be suppressed. Therefore, the content is preferably 0.5% by mass or more. When the content is 5.0% by mass or less, the active energy ray-curable resin composition has a low viscosity, and therefore operability is excellent. A swelling property of a cured product in a washing liquid is large. Therefore, the content is preferably 5.0% by mass or less.

The active energy ray-curable resin composition of the present invention is cured by irradiation with an active energy ray. The active energy ray in the present invention is an electromagnetic wave or a charged particle beam having an energy quantum. That is, the active energy ray means a light energy ray such as visible light, an electron beam, an ultraviolet ray, an infrared ray, an X-ray, an α-ray, a β-ray, or a γ-ray, for example. Examples of an active energy ray source include a ray source such as a high-pressure mercury lamp, a halogen lamp, a xenon lamp, a metal halide lamp, a LED lamp, an electron beam accelerator, or a radioactive element. An active energy ray for irradiation is preferably an ultraviolet ray from a viewpoint of storage stability of the active energy ray-curable resin composition, a low curing rate, and a low toxicity.

A required amount of active energy ray irradiation (accumulated light amount) is not particularly limited. The required amount varies according to the type and addition amount of each of the ionic monomer (A), the nonionic water-soluble monomer (B), and the photopolymerization initiator (D) used in the active energy ray-curable resin composition. The accumulated light amount is preferably 50 mJ/cm$^2$ or more and 1000 mJ/cm$^2$ or less. When the accumulated light amount is 50 mJ/cm$^2$ or more, curing proceeds sufficiently, and a cured product has excellent tensile strength, hardness, elasticity, and the like. In addition, bleeding out of the non-polymerizable compound (C) is suppressed. Therefore, the accumulated light amount is preferably 50 mJ/cm$^2$ or more and 1000 mJ/cm$^2$ or less. When the accumulated light amount is 1000 mJ/cm$^2$ or less, irradiation time of an active energy ray is short, leading to improvement of productivity in addition manufacturing. Therefore, the accumulated light amount is preferably 1000 mJ/cm$^2$ or less.

In the active energy ray-curable resin composition of the present invention, an ethylenically unsaturated compound (F) can be further used in addition to the ionic monomer (A), the nonionic water-soluble monomer (B), and the polyfunctional unsaturated monomer (E). The ethylenically unsaturated compound (F) is a monofunctional (meth)acrylate or vinyl compound. One compound may be used singly. Alternatively, two or more compounds may be used in combination. The addition amount of the ethylenically unsaturated compound (F) is not particularly limited as long as not adversely affecting a characteristic exhibited by the active energy ray-curable resin composition according to the present invention. The addition amount is preferably in a range of 10% by mass or less with respect to the entire active energy ray-curable resin composition.

Examples of the above monofunctional (meth)acrylate include alkyl (meth)acrylate having a linear, branched, or cyclic alkyl group with 1 to 22 carbon atoms introduced, phenoxyalkyleneglycol (meth)acrylate, phenoxydialkyleneglycol (meth)acrylate, phenoxytrialkyleneglycol (meth)acrylate, and phenoxypolyalkyleneglycol (meth)acrylate having a functional group containing a phenoxy group and an alkylene glycol group with 1 to 4 carbon atoms introduced, benzyl (meth)acrylate, phenoxyethyl (meth)acrylate, dicyclopentanyl (meth)acrylate, dicyclopentanyloxyethyl (meth)acrylate, dicyclopentenyl (meth)acrylate, dicyclopentenyloxyethyl (meth)acrylate, bornyl (meth)acrylate, isobornyl (meth)acrylate, 2-methyl-2-adamantyl (meth)acrylate, allyl (meth)acrylate, and glycidyl (meth)acrylate.

Examples of the above vinyl compound include vinyl acetate, methyl vinyl ether, ethyl vinyl ether, styrene, p-alkylstyrene having an alkyl group with 1 to 18 carbon atoms introduced, and N-vinylcaprolactam.

Various additives can be used in the active energy ray-curable resin composition of the present invention, as necessary. Examples of the additive include a thermal polymerization inhibitor, an anti-aging agent, an antioxidant, an ultraviolet sensitizer, a preservative, a phosphate type and another flame retardant, a surfactant, a wet dispersing material, an antistatic agent, a coloring agent, a plasticizer, a surface lubricant, a leveling agent, a softening agent, a pigment, an organic filler, and an inorganic filler. The addition amount of these resins and additives is not particularly limited as long as not adversely affecting a characteristic exhibited by the active energy ray-curable resin composition according to the present invention. The addition amount is preferably 5% by mass or less with respect to the entire active energy ray-curable resin composition.

Examples of the thermal polymerization inhibitor include hydroquinone, p-methoxyphenol, 2,6-di-tert-butyl-p-cresol, 2,2,6,6-tetramethylpiperidine-1-oxyl, 4-hydroxy-2,2,6,6-tetramethylpiperidine-1-oxyl, phenothiazine, pyrogallol, and β-naphthol.

Examples of the anti-aging agent include hindered phenol type compounds such as butylated hydroxy toluene and butyl hydroxy anisole, benzotriazole type compounds, and hindered amine type compounds.

Examples of the surfactant include alkylene oxide addition type nonionic surfactants such as a polyethylene oxide adduct of nonylphenol, a polyethylene oxide adduct of lauric acid, and a polyethylene oxide adduct of stearic acid; polyhydric alcohol type nonionic surfactants such as sorbitan palmitic acid monoester, sorbitan stearic acid monoester, and sorbitan stearic acid triester; acetylene-based glycol compound type nonionic surfactants; acetylene-based polyalkylene glycol compound type nonionic surfactants; fluorine-containing surfactants such as a perfluoroalkyl polyethylene oxide adduct, perfluoroalkyl carboxylate, and perfluoroalkyl betaine; modified silicone oils such as polyether-modified silicone oil and (meth)acrylate-modified silicone oil; and an amphoteric polymer surfactant (manufactured by BYK Japan KK, BYKJET-9150, BYKJET-9151, and the like).

In a method for using the active energy ray-curable resin composition of the present invention, the active energy ray-curable resin composition is irradiated with an active energy ray to be cured simultaneously with or immediately after formation of a predetermined shape pattern. In addition, an optical molding method for discharging the active energy ray-curable resin composition by an inkjet method and then curing the active energy ray-curable resin composition by irradiation with an active energy ray is preferably used. The viscosity is preferably from 1 mPa·s to 100 mPa·s at 25° C. from a viewpoint of stably discharging the active energy ray-curable resin composition. The discharge temperature is preferably in a range of 20 to 80° C. When the discharge temperature is set to a high temperature, the viscosity of the active energy ray-curable resin composition is lowered, and therefore a high viscosity resin can be discharged. However, denaturation and polymerization by heat easily occur. Discharge at a temperature of lower than 80° C. is preferable from a viewpoint of thermal stability of the active energy ray-curable resin composition. Therefore, the viscosity of the active energy ray-curable resin composition is more preferably 80 mPa·s or less.

The method for using the active energy ray-curable resin composition of the present invention is preferably the following method. In this method, first, fine droplets of the active energy ray-curable resin composition are discharged from an ink discharge nozzle by an ink jet method so as to draw a predetermined shape pattern. Then, a cured thin film is formed by irradiating the discharged active energy ray-curable resin composition with an active energy ray. Specifically, first, the following data is formed as three-dimensional molding data based on three-dimensional CAD data of an object to be molded. That is, cross-sectional shape data obtained by slicing a cured thin film of a model material corresponding to a three-dimensional molded product to be molded in a lamination direction thereof is created. Furthermore, data obtained by slicing a cured thin film of a support material for supporting a model material during molding in a lamination direction thereof is created. For example, when a model material at an upper position has a so-called overhanging portion, installation data of a support material is created such that the support material is provided such that this overhanging portion is supported from a lower side due to the support material disposed around a model material at a lower position. A photocurable ink for a model material or an active energy ray-curable resin composition as a raw material of a support material is discharged from an inkjet nozzle in a desired pattern according to cross-sectional shape data of a model material and a support material, and a thin film layer of the resin is thereby formed. Thereafter, the thin film layer of the resin is cured by irradiation with curing light from a light source. Subsequently, a photocurable ink for a model material and/or an active energy ray-curable resin composition for a support material are/is supplied onto the cured thin film layer of the resin from the inkjet nozzle according to a subsequent cross-sectional shape. By repeating the above operation, the cured resin layer corresponding to each cross-sectional shape is laminated. As a result, an intended three-dimensional molded product and support are formed. The support is usually formed between a planar stage and the three-dimensional molded product. When the support is formed, an active energy ray-curable resin composition for forming a support material is supplied from an ink jet nozzle. When the three-dimensional molded product is formed, a photo-curable ink for a model material is supplied from an inkjet nozzle. The photocurable ink for a model material and the active energy ray-curable resin composition for forming a support material may be discharged from the same ink jet nozzle, or may be discharged from separate ink jet nozzles.

The support material of the present invention can be obtained by curing an active energy ray-curable resin composition by irradiation with an active energy ray. In addition, it is possible to obtain a roughly modeled product including a three-dimensional molded product supported by a support material used as a shape supporting support material in three-dimensional molding. An obtained roughly modeled product is immersed in a washing liquid. The support material is dissolved, dispersed, or swollen in the washing liquid, and is removed. As a result, a three-dimensional molded product can be easily obtained. In a case of swelling in a washing liquid, a support material can be peeled and removed from a three-dimensional molded product without applying an external force due to an internal stress caused by a difference in a swelling ratio between the support material and the three-dimensional molded product (model material). Furthermore, the swollen and peeled support material absorbs the washing liquid to become a swollen gel. The swollen gel and the washing liquid are separated into two phases. Therefore, contamination by a resin dissolved in the washing liquid is not observed on a surface of the three-dimensional molded product. As a result, in a finishing step, it is only required to remove the washing liquid by volatilization. Therefore, the step can be simplified. The swollen support material is phase-separated from the washing liquid. Therefore, the support material can be easily separated and collected from the washing liquid by filtration. Therefore, an effect of reducing an environmental load can be also expected.

Water is usually used for washing the support material of the present invention. As the water, tap water, pure water, or deionized water is used. An alkaline aqueous solution or electrolyte solution, or an organic solvent can be also used as long as being able to dissolving, dispersing, or swelling a support material obtained by curing the active energy ray-curable resin composition of the present invention, and being able to prevent a three-dimensional molded product from being dissolved or swollen. Examples of the alkaline aqueous solution include aqueous solutions of an alkali metal hydroxide and an alkaline earth metal hydroxide, such as a sodium hydroxide aqueous solution, a potassium hydroxide aqueous solution, and a calcium hydroxide aqueous solution. Examples of the electrolyte solution include an aqueous solution of an electrolyte such as potassium carbonate, sodium carbonate, ammonia, or tetramethylammonium hydroxide. Examples of the organic solvent include an alcohol, a ketone, an alkylene glycol, a polyalkylene glycol, a glycol ether, and a glycol ester. One of water, an alkaline aqueous solution, an electrolyte solution, and an organic solvent can be used singly, or two or more kinds thereof can be used in combination. Water is particularly preferable as a washing liquid because water does not dissolve a three-dimensional molded product but easily dissolves, disperses, or swells a support material, and also from a viewpoint of safety.

The washing time of a support material is preferably 24 hours or less, and more preferably 10 hours or less. When the washing time is 24 hours or less, a washing cycle can be repeated every day efficiently. Therefore, the washing time is preferably 24 hours or less from a viewpoint of production efficiency. When the washing time is 10 hours or less, a molded product manufactured in the daytime is washed at night, and washing can be completed the next day. Therefore, more efficient production is possible. Therefore, the washing time is more preferably 10 hours or less. In addition, the shorter the washing time is, the higher the production efficiency is, and therefore the shorter washing time is more preferable. The washing time is more preferably 5 hours or less, and still more preferably 1 hour or less.

It is possible to set the washing temperature of a support material at any temperature between 0° C. and 100° C. However, in washing at a high temperature, there is a possibility that a resin forming a three-dimensional molded product may deform due to heat. On the other hand, dissolution, dispersion, or swelling of a support material advances more rapidly as the temperature is higher. Therefore, washing is more preferably performed at 10° C. or higher and 40° C. or lower.

The shape of a support material can be any shape as long as being provided so as to support the shape of a three-dimensional molded product. The support material of the present invention can be obtained as a support capable of being removed through dissolution, dispersion, or swelling by immersion into the washing water. It is also possible to provide a large number of supports in contact with any outer surface of a roughly modeled product. In this way, by providing a large number of supports, deformation due to its own weight is prevented. In addition, there is also an effect of shielding light against a portion molding of which has been finished. Therefore, degradation of a roughly modeled product due to excessive irradiation with an activation energy ray can be also prevented.

EXAMPLES

Hereinafter, the present invention will be described more specifically with reference to Examples and Comparative Examples. However, the present invention is not limited to these Examples. In the following, "parts" and "%" are all based on mass unless otherwise specified.

Manufacturing Example 1 Manufacturing Urethane Acrylamide (E-1)

In a 300 mL separable flask equipped with a stirrer, a thermometer, and a reflux condenser, 44.07 g of polyethylene glycol having a terminal hydroxy group with a hydroxy value of 374 mg KOH/g and a number average molecular weight of 300 and 0.20 g of methylhydroquinone as a polymerization inhibitor were added. Thereto, 38.31 g of tolylene diisocyanate was added as a polyisocyanate. A reaction was performed at 60° C. for 3 hours while stirring was performed in a nitrogen atmosphere. To this reaction product, 17.40 g of N-(2-hydroxyethyl) acrylamide and 0.02 g of dibutyltin dilaurate as a catalyst were further added. A reaction was performed at 60° C. for 3 hours. Then, it was confirmed by IR measurement that an absorption peak of an isocyanate group at 2230 cm$^{-1}$ disappeared. Thereafter, the reactor was cooled to obtain urethane acrylamide (E-1: PEG300/TDI urethane acrylamide) having a weight average molecular weight of 4,800. Note that the weight average molecular weight of the obtained urethane acrylamide (E-1) was calculated by performing a measurement with a high performance liquid chromatography (LC-10A manufactured by Shimadzu Corporation was used. Shodex GPC KF-806L (exclusion limit molecular weight: 2×107, separation range: 100 to 2×107, theoretical plate number: 10,000 steps/column, filler material: styrene-divinylbenzene copolymer, filler particle diameter: 10 μm) was used as a column, and tetrahydrofuran was used as an eluent), and then converting the measurement result into a standard polystyrene molecular weight.

Manufacturing Example 2 Manufacturing Urethane Acrylamide (E-6)

In a 300 mL separable flask equipped with a stirrer, a thermometer, and a reflux condenser, 65.41 g of polyethylene glycol having a terminal hydroxy group with a hydroxy value of 187 mg KOH/g and a number average molecular weight of 600 and 0.20 g of methylhydroquinone as a polymerization inhibitor were added. Thereto, 29.03 g of isophorone diisocyanate as polyisocyanate and 0.02 g of dibutyltin dilaurate as a catalyst were added. A reaction was performed at 60° C. for 3 hours while stirring was performed in a nitrogen atmosphere. To this reaction product, 5.32 g of N-(2-hydroxyethyl) acrylamide and 0.02 g of dibutyltin dilaurate as a catalyst were further added. Then, a reaction was performed at 60° C. for 3 hours. It was confirmed by IR measurement that an absorption peak of an isocyanate group at 2230 $cm^{-1}$ disappeared. Thereafter, the reactor was cooled to obtain urethane acrylamide (E-6: PEG600/IPDI urethane acrylamide) having a weight average molecular weight of 12,600.

Examples 2 to 9

Active energy ray-curable resin compositions corresponding to Examples 2 to 9 were obtained by performing a similar operation to that in Example 1 with the compositions shown in Table 1.

Comparative Examples 1 to 4

Active energy ray-curable resin compositions corresponding to Comparative Examples 1 to 4 were obtained by performing a similar operation to that in Example 1 with the compositions shown in Table 1. Here, Comparative Example 2 referred to Example 5 described in Patent Literature 11 (WO2014-051046), Comparative Example 3 referred to Example 9 described in Patent Literature 8 (JP 2010-155889 A), and Comparative Example 4 referred to Example 2-1 described in Patent Literature 9 (JP 2012-111226 A).

TABLE 1

| | (A) parts by mass | | (B) parts by mass | | (C) parts by mass | | (D) parts by mass | | (E) parts by mass | | (F) parts by mass | | (G) parts by mass | |
|---|---|---|---|---|---|---|---|---|---|---|---|---|---|---|
| Example 1 | a1-1 | 1 | B-1 | 44 | C-1 | 50 | D-1 | 5 | — | — | — | — | — | — |
| Example 2 | a1-1 | 5 | B-1 | 42 | C-1 | 50 | D-2 | 3 | — | — | — | — | — | — |
| Example 3 | a1-2 | 13 | B-1 | 40 | C-1 | 20 | D-2 | 1 | — | — | — | — | G-1 | 1 |
| | | | B-2 | 10 | C-2 | 15 | | | | | | | | |
| Example 4 | a2-1 | 10 | B-2 | 28.8 | C-3 | 20 | D-1 | 1 | E-1 | 0.2 | — | — | — | — |
| | | | | | C-4 | 40 | | | | | | | | |
| Example 5 | a2-2 | 20 | B-2 | 40 | C-3 | 10 | D-2 | 0.5 | — | — | — | — | — | — |
| | | | | | C-4 | 29.5 | | | | | | | | |
| Example 6 | a1-3 | 30 | B-3 | 10 | C-5 | 59.9 | D-1 | 0.1 | — | — | — | — | — | — |
| Example 7 | a1-1 | 10 | B-1 | 60 | C-2 | 25 | D-2 | 3 | — | — | — | — | G-2 | 2 |
| Example 8 | a1-1 | 10 | B-1 | 35 | C-2 | 10 | D-2 | 2 | — | — | F-1 | 2 | G-3 | 1 |
| | | | | | C-6 | 40 | | | | | | | | |
| Example 9 | a1-1 | 10 | B-2 | 35 | C-5 | 49 | D-2 | 1 | — | — | — | — | — | — |
| | | | B-4 | 5 | | | | | | | | | | |
| Comparative Example 1 | — | — | B-1 | 49 | C-1 | 50 | D-2 | 1 | — | — | — | — | — | — |
| Comparative Example 2 | — | — | — | — | — | — | D-2 | 5 | E-2 | 50 | — | — | G-4 | 1.1 |
| | | | | | | | | | E-3 | 50 | | | | |
| Comparative Example 3 | — | — | B-2 | 36.9 | C-7 | 50.4 | D-1 | 5 | E-4 | 12.9 | — | — | G-5 | 0.5 |
| Comparative Example 4 | — | — | B-2 | 20 | C-6 | 40 | D-1 | 3 | — | — | — | — | G-3 | 0.1 |
| | | | | | C-8 | 40 | | | | | | | | |

Examples 1 to 9 and Comparative Examples 1 to 4 Active Energy Ray-Curable Resin Compostion for Water-Soluble or Water-Dispersible Support Material

Example 1

Into a container, 1.0 part by mass of N,N,N-trimethylammonium propylacrylamide p-toluenesulfonate (a1-1), 44.0 parts by mass of N-acryloylmorpholine (B-1), 50.0 parts by mass of polyethylene glycol having a number average molecular weight of 600 (PEG600, manufactured by TOHO Chemical Industry Co., Ltd.) (C-1), and 5.0 parts by mass of IRGACURE184 (1-hydroxycyclohexyl phenyl ketone (manufactured by BASF Japan Ltd.) (D-1) were put. The resulting mixture was stirred at 25° C. for 1 hour to obtain a uniform and transparent active energy ray-curable resin composition of Example 1.

Examples 10 to 16 and Comparative Example 5 Active Energy-Ray-Curable Resin Composition for Water-Swellable Suppoprt Material

Example 10

Into a container, 2.0 parts by mass of sodium acrylate (a2-1), 17.4 parts by mass of N-(2-hydroxyethyl) acrylamide (B-2), 10.0 parts by mass of deionized water (C-3), 70.0 parts by mass of diethylene glycol monoethyl ether (C-4), 0.1 parts by mass of IRGACURE184 (1-hydroxycyclohexyl phenyl ketone (manufactured by BASF Japan Ltd.) (D-1), and 0.5 parts by mass of diethylene glycol diacrylate (E-5) were put. The resulting mixture was stirred at 25° C. for 1 hour to obtain a uniform and transparent active energy ray-curable resin composition of Example 10.

Examples 11 to 16

Activity energy ray-curable resin compositions corresponding to Examples 11 to 16 were obtained by performing a similar operation to that in Example 10 with the compositions shown in Table 2.

Comparative Example 5

An active energy ray-curable resin composition corresponding to Comparative Example 5 was obtained by performing a similar operation to that in Example 10 with the composition shown in Table 2. Here, Comparative Example 5 referred to Example 2-2 described in Patent Literature 9 (JP 2012-111226 A).

TABLE 2

| | (A) parts by mass | | (B) parts by mass | | (C) parts by mass | | (D) parts by mass | | (E) parts by mass | | (G) parts by mass | |
|---|---|---|---|---|---|---|---|---|---|---|---|---|
| Example 10 | a2-1 | 2 | B-2 | 17.4 | C-3 | 10 | D-1 | 0.1 | E-5 | 0.5 | — | — |
| | | | | | C-4 | 70 | | | | | | |
| Example 11 | a1-2 | 30 | B-5 | 20 | C-2 | 40 | D-1 | 5 | E-6 | 5 | — | — |
| Example 12 | a1-1 | 20 | B-2 | 2 | C-5 | 75 | D-2 | 0.5 | E-1 | 2.5 | — | — |
| Example 13 | a1-3 | 5 | B-2 | 50 | C-4 | 40 | D-2 | 3 | E-6 | 1 | G-1 | 1 |
| Example 14 | a1-1 | 15 | B-2 | 10 | C-4 | 40 | D-1 | 1 | E-6 | 4 | — | — |
| | | | | | C-6 | 30 | | | | | | |
| Example 15 | a1-1 | 7 | B-1 | 40 | C-2 | 50 | D-2 | 1 | E-1 | 2 | — | — |
| Example 16 | a1-1 | 10 | B-2 | 5 | C-4 | 30 | D-2 | 1 | E-1 | 2 | G-1 | 1 |
| | | | B-1 | 20 | C-2 | 30 | | | | | | |
| | | | B-4 | 1 | | | | | | | | |
| Comparative Example 5 | — | — | B-2 | 30 | C-6 | 70 | D-1 | 3 | — | — | — | — |

Description of Abbreviations in Tables 1 and 2

A: Ionic monomer (a1: cationic monomer, a2: anionic monomer)
  a1-1: N,N,N-trimethylammonium propylacrylamide p-toluenesulfonate
  a1-2: N,N,N-trimethylammonium propylacrylamide hydrochloride
  a1-3: N,N,N-trimethylammonium ethyl acrylate methanesulfonate
  a2-1: Sodium acrylate
  a2-2: Acrylic acid 2-aminoethanol salt
B: Nonionic water-soluble monomer
  B-1: N-acryloyl morpholine
  B-2: N-(2-hydroxyethyl) acrylamide
  B-3: 4-hydroxybutyl acrylate
  B-4: 2-hydroxyethyl methacrylate
  B-5: N,N-diethylacrylamide
C: Non-polymerizable compound
  C-1: Polyethylene glycol having a number average molecular weight of 600 (PEG600, manufactured by Toho Chemical Industry Co., Ltd.)
  C-2: Polyethylene glycol having a number average molecular weight of 200 (PEG200, manufactured by Toho Chemical Industry Co., Ltd.)
  C-3: Deionized water
  C-4: Diethylene glycol monoethyl ether
  C-5: Diethylene glycol
  C-6: 1,2-polypropylene glycol having a number average molecular weight of 400 (Uniol D400, manufactured by NOF CORPORATION)
  C-7: 1,2-polypropylene glycol
  C-8: 1,2-polypropylene glycol having a number average molecular weight of 1,000 (Uniol D1000, manufactured by NOF CORPORATION)
D: Photopolymerization initiator
  D-1: 1-hydroxycyclohexyl phenyl ketone (IRGACURE184, manufactured by BASF Japan Ltd.)
  D-2: 2,4,6-trimethylbenzoyl-diphenyl-phosphine oxide (IRGACURE-TPO, manufactured by BASF Japan Ltd.)
E: Polyfunctional unsaturated monomer
  E-1: PEG300/TDI urethane acrylamide
  E-2: Polyethylene glycol (molecular weight 200) diacrylate
  E-3: Ethoxylate glycerol triacrylate
  E-4: Polyethylene glycol (molecular weight 1000) diacrylate
  E-5: Diethylene glycol diacrylate
  E-6: PEG600/IPDI urethane acrylamide
F: Ethylenically unsaturated compound other than A, B and E
  F-1: n-butyl acrylate
G: Other additive
  G-1: Surfynol 440 (manufactured by Air Products Japan)
  G-2: Emanon 1112 (polyethylene oxide laurate (12E.O) adduct, manufactured by Kao Corporation)
  G-3: BYK307 (polyether-modified polydimethylsiloxane, manufactured by BYK Japan KK)
  G-4: Neoperex G-15 (sodium dodecylbenzenesulfonate, manufactured by Kao Corporation)
  G-5: 2,4-diphenyl-4-methyl-pentene Evaluation using the active energy ray-curable resin compositions for forming a support material, obtained in Examples 1 to 9, Comparative Examples 1 to 4, Examples 10 to 16, and Comparative Examples 5 to 7 was performed in the following manner. The results are shown in Tables 3 and 4.

Viscosity Measurement

The viscosity of the active energy ray-curable resin composition obtained in each of Examples and Comparative Examples was measured using a cone-plate type viscometer (apparatus name: RE550 type viscometer manufactured by Toki Sangyo Co., Ltd.) according to JIS K5600-2-3 at 25° C.

Curability

A heavy release PET film having a thickness of 75 μm (manufactured by Toyobo Co., Ltd., polyester film E7001) was brought into close contact with a horizontally placed glass plate (such that a surface to be treated was on the front). The active energy ray-curable resin composition obtained in each of Examples and Comparative Examples was applied onto the film with a bar coater so as to have a thickness of 50 μm. The applied active energy ray-curable resin composition was irradiated with an ultraviolet ray in the air (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$), and the accumulated light amount required for curing the active energy ray-curable resin composition was measured. Curing described here means a state in which a surface of a coating film is not sticky.

Bleeding out Resistance

A heavy release PET film having a thickness of 75 μm (manufactured by Toyobo Co., Ltd., polyester film E7001) was brought into close contact with a horizontally placed glass plate. A spacer having a thickness of 1 mm and an inner size of 50 mm×20 mm was installed therein. The active energy ray-curable resin composition obtained in each of Examples and Comparative Examples was filled into the spacer. Thereafter, a light release PET film having a thickness of 50 μm (manufactured by Toyobo Co., Ltd., polyester film E7002) was further superimposed thereon. The active energy ray-curable resin composition was cured by irradiation with a ultraviolet ray (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$). The accumulated light amount of irradiation with a ultraviolet ray was equal to the accumulated light amount obtained in the above curability evaluation. Thereafter, the release PET films on both sides were removed to prepare a cured product, and the cured product was used as a test piece. The test piece was allowed to stand in a constant temperature and humidity chamber set to 25° C. and 50% RH for 168 hours. The surface of the test piece before and after standing was visually evaluated.

⊚: Bleeding out is not observed both before and after standing

○: Although bleeding out is not observed before standing, bleeding out is slightly observed after standing Δ: Bleeding out is observed slightly before standing, and bleeding out is observed to some extent after standing x: Bleeding out is observed to some extent before standing, and bleeding out is observed intensely after standing Removability of Support Material (Water-Soluble and Water-Dispersible Support Material)

A spacer having a thickness of 1 mm and an inner size of 50 mm×40 mm was installed in a horizontally placed polymethyl methacrylate plate (PMMA plate) having a thickness of 1 mm. "LH100white" manufactured by Mimaki Engineering Co., Ltd. as a curable resin composition forming a model material before photocuring and 1 g of the active energy ray-curable resin composition obtained in each of Examples 1 to 9 and Comparative Examples 1 to 4 were filled into the spacer so as to be in contact with each other. Thereafter, a model material and a support material were obtained by irradiation with a ultraviolet ray (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$). The accumulated light amount of irradiation with a ultraviolet ray was equal to the accumulated light amount obtained in the above curability evaluation. Thereafter, the obtained model material and support material on the PMMA plate were immersed in deionized water as a washing liquid at room temperature (25° C.). Time until the support material was dissolved or dispersed in water and the support material was removed from the model material and the PMMA plate was checked. States of the model material and the PMMA plate after removal were checked, and the result was evaluated by the following evaluation method.

⊚: An entire support material is removed (A contact portion with a model material and a surface of a PMMA plate have no roughness, stickiness, or the like)

○: A support material is removed almost completely (a contact portion with a model material and a surface of a PMMA plate have slight roughness, stickiness, or the like, which can be washed with water flow)

Δ: A most part of a support material is removed (a contact portion with a model material and a surface of a PMMA plate have residual roughness, stickiness, or the like, which cannot be washed with water flow)

Δx: A part of a support material is removed (a contact portion with a model material and a surface of a PMMA plate have a large amount of a residue of the support material)

x: A support material is not removed

State of Washing Liquid after Removal of Support Material (Water-Soluble and Water-Dispersible Support Material)

In the above removability of a support material, a state of a washing liquid after a support material was dissolved or dispersed in water was checked. The results were evaluated by the following evaluation method.

⊚: A support material is uniformly dissolved in a washing liquid and is transparent ○: A support material is uniformly dispersed in a washing liquid and is clouded Δ: A support material is non-uniformly dispersed in a washing liquid, and precipitation of a dispersion is observed x: A part of a support material is precipitated Swellability (Water-Swellable Support Material)

A swelling ratio of a support material is determined from the following calculation formula. A rectangular support material of 50 mm×20 mm×1 mm obtained from each of Examples 10 to 16 and Comparative Examples 3 and 5 was used in a similar manner to bleeding out resistance. The support material was immersed in a washing liquid at 25° C. for 24 hours. The swelling ratio was calculated from the lengths of a long side of the support material before and after immersion.

Swelling ratio (%)=(length of cured product after immersion-length of cured product before immersion)/length of cured product before immersion×100

Note that deionized water was used as the washing liquid.

Removability of Water-Swellable Support Material

A spacer having a thickness of 1 mm and an inner size of 50 mm×20 mm was installed in a horizontally placed PMMA plate having a thickness of 1 mm. The active energy ray-curable resin composition obtained in each of Examples 10 to 16 and Comparative Examples 3 and 5 was filled into the spacer. Thereafter, a support material was obtained by irradiation with a ultraviolet ray (apparatus: manufactured by Eye Graphics Co., Ltd., inverter type conveyor apparatus ECS-4011GX, metal halide lamp: M04-L41 manufactured by Eye Graphics Co., Ltd., ultraviolet illuminance: 300 mW/cm$^2$, accumulated light amount in one pass: 200 mJ/cm$^2$). The accumulated light amount of irradiation with a ultraviolet ray was equal to the accumulated light amount obtained in the above curability evaluation. Thereafter, the obtained support material on the PMMA plate was immersed in a washing liquid. Time until the support material was naturally peeled from the PMMA plate and a peeling state were checked. The results were evaluated by the following evaluation method. As the washing liquid, deionized water was used.

⊚: An entire support material is removed (A surface of a PMMA plate has no roughness, stickiness, or the like)

○: A support material is removed almost completely (a surface of a PMMA plate has slight roughness, stickiness, or the like, which can be washed with water flow)

Δ: A most part of a support material is removed (a surface of a PMMA plate has residual roughness, stickiness, or the like, which cannot be washed with water flow)

Δx: A part of a support material is removed (a surface of a PMMA plate has a large amount of a residue of the support material)

x: A support material is not removed

Separability of Model Material/Support Material

In a 10 ml graduated cylinder, 3 g of the active energy ray-curable resin composition obtained in each of Examples and Comparative Examples was put. Thereonto, 3 g of "LH100white" was introduced quietly so as not to be mixed with a support material. The graduated cylinder the whole of which was covered with an aluminum foil such that no light entered the graduated cylinder was allowed to stand for 24 hours. Thereafter, an interface state between LH100white and the active energy ray-curable resin composition for a support material were observed. Separability between a model material and a support material was evaluated by the following evaluation method.

⊚: Excellent separability (an interface can be clearly observed)

○: Sufficient separability is observed (the vicinity of an interface is not clouded and the interface can be observed)

Δ: Separability is observed insufficiently (the vicinity of an interface is clouded and the interface can be hardly observed)

x: No separability (the whole is clouded and a mixed state is observed)

Molding Accuracy at Bounday of Model Material/Support Material

A cured product was prepared in the same manner as the above removability of a support material. However, just before irradiation with an ultraviolet irradiation apparatus, a tip was caused to reach a PMMA surface by vertical piercing into "LH100white". Thereafter, by horizontally moving the tip to the side of the active energy ray-curable resin composition obtained in each of Example and Comparative Examples as it was, a portion of a model material extending thinly toward a support material was prepared. In this state, irradiation with a ultraviolet ray was performed immediately to obtain a cured product, and the cured product was immersed in deionized water. The support material was removed, and the cured product was then taken out. A state of a boundary between the model material and the support material was evaluated by the following evaluation method.

⊚: Molding accuracy at a boundary is excellent (a thinly extended model material is cured and remains almost as it is)

○: Molding accuracy at a boundary is slightly excellent (about a half length of a thinly extended model material remains)

Δ: Molding accuracy at a boundary is slightly poor (only a root portion having a cross-sectional area of about 1 mm of a thinly extended model material is cured and remains)

x: Molding accuracy is poor (the portion of a thinly extended model material disappears, and the extended portion cannot be specified)

TABLE 3

| | resin composition, physical properties | | support material, physical properties | | | | | |
|---|---|---|---|---|---|---|---|---|
| | viscosity (mPa·s 25° C.) | curability (mJ/cm2) | bleeding out resistance | removability | washing time (h) | washing liquid state | separability | molding accuracy |
| Example 1 | 77 | <200 | ○ | ○ | 2 | ○ | ○ | ○ |
| Example 2 | 83 | <200 | ○ | ⊚ | 2 | ○ | ○ | ○ |
| Example 3 | 52 | <200 | ⊚ | ⊚ | 2 | ⊚ | ⊚ | ⊚ |
| Example 4 | 42 | <200 | ○ | ○ | 5 | ○ | ⊚ | ○ |
| Example 5 | 70 | 600 | ○ | ○ | 2 | ○ | ⊚ | ○ |
| Example 6 | 96 | 1000 | ○ | ○ | 1 | ⊚ | ⊚ | ○ |
| Example 7 | 36 | <200 | ⊚ | ⊚ | 2 | ○ | ⊚ | ⊚ |
| Example 8 | 59 | <200 | ⊚ | ⊚ | 1 | ○ | ○ | ○ |
| Example 9 | 66 | 1000 | ⊚ | ⊚ | 1 | ⊚ | ○ | ○ |
| Comparative Example 1 | 71 | <200 | ○ | Δ | 12 | Δ | Δ | Δ |
| Comparative Example 2 | 45 | 600 | ○ | Δ | 24 | X | X | X |
| Comparative Example 3 | 73 | 2000 | ○ | X | <168 | X | X | X |
| Comparative Example 4 | 220 | 600 | X | Δ | 1 | Δ | Δ | Δ |

TABLE 4

| | curable composition | | support material, physical properties | | | |
|---|---|---|---|---|---|---|
| | viscosity (25° C.) (mPa · s) | curability mJ/cm² | bleeding out resistance | swelling ratio (%) | peeling state | removal time (h) |
| Example 10 | 23 | 1000 | ○ | 100 | ○▲ | 10 |
| Example 11 | 93 | 600 | ◎ | 100 | ○▲ | 10 |
| Example 12 | 67 | 600 | ○ | 200 | ○ | 5 |
| Example 13 | 40 | <200 | ◎ | 250 | ○ | 3 |
| Example 14 | 15 | <200 | ○ | 100 | ◎ | 1 |
| Example 15 | 71 | <200 | ◎ | 200 | ◎ | 2 |
| Example 16 | 77 | <200 | ◎ | 200 | ◎ | 1 |
| Comparative Example 3 | 73 | 2000 | ○ | 5 | X | 168 |
| Comparative Example 5 | 220 | 600 | X | dissolved | ▲X | 1 |

As results of Table 3 clearly indicate, active energy ray-curable resin compositions in Examples 1 to 9 have a viscosity of 100 mPa·s or less at 25° C. Therefore, these resin compositions have excellent operability. In addition, these resin compositions can be cured at the accumulated light amount of 1000 mJ/cm² or less even in the air. That is, these resin compositions exhibited excellent curability. In addition, bleeding out of a non-polymerizable compound from a support material obtained by curing was hardly observed. That is, these resin compositions were resins suitable for the support material. Furthermore, any one of Examples exhibited an excellent dissolution and dispersion property in deionized water. The support material could be removed completely at a low temperature in a short time. In addition, an excellent separation property from a model material and a high molding accuracy were exhibited. Furthermore, the support material which has been dissolved or dispersed has an ionic property and a surface activity. Therefore, a washing property on a surface of a PMAA plate or a model material after removal of the support material was also excellent. On the other hand, in Comparative Examples 1 to 3 containing no ionic monomer, it took time for water dispersion. In addition, a support material remained on a surface of a PMAA plate or a model material after removal. The residue was sticky. Therefore, the residue could not be removed completely by washing with water. Furthermore, a separation property from a model material in support materials in Comparative Examples was low. Therefore, mixing occurred at a contact portion between a composition in each of Comparative Examples 1 and 2 and "LH100white" before curing. Therefore, the molding accuracy was low. In Comparative Example 3, the accumulated light amount of 2000 mJ/cm² or more was required for curing. Therefore, the curability was low. In addition, the support material was hardly removed even by immersion in deionized water. Therefore, a step of scraping the support material with a spatula or the like was required. In Comparative Example 4, the curability was satisfactory. However, the viscosity of a liquid resin was as high as 200 mPa·s or more at 25° C. Therefore, the operability was reduced. In addition, in Comparative Example 4, polypropylene glycol corresponding to a non-polymerizable compound was used in an amount of 75% by mass or more. Therefore, bleeding out occurred severely. A separation property from a model material and a molding accuracy were low. As for removability, the support material in Comparative Example 4 was dispersed in deionized water in one hour. However, a part of the dispersed support material was observed as a yellow oil-like deposit on a surface of a PMAA plate or a model material. That is, the support material could not be removed completely by washing with water. Therefore, it was necessary to wipe off the support material with an organic solvent such as alcohol.

As results of Table 4 clearly indicate, active energy ray-curable resin compositions obtained in Examples 10 to 16 have a viscosity of 100 mPa·s or less at 25° C. Therefore, these resin compositions have excellent operability. In addition, N-substituted (meth)acrylamide is blended in these resin compositions. Therefore, these resin compositions can be cured at the accumulated light amount of 1000 mJ/cm² or less even in the air. That is, these resin compositions exhibited excellent curability. In addition, bleeding out of a non-reactive diluent from a support material obtained by curing was not observed. That is, these resin compositions were resins suitable for the support material. Furthermore, any one of Examples exhibited an excellent washing property in deionized water. On the other hand, in Comparative Example 3 of the present invention corresponding to Example 9 described in Patent Literature 8 (JP 2010-155889 A), a liquid resin had a low viscosity. Therefore, the operability was excellent. However, the accumulated light amount of 2000 mJ/cm² or more was required for curing. Therefore, the curability was low. In addition, in Comparative Example 3 containing no ionic monomer, even when a support material was immersed in deionized water, the support material was hardly swelled. Therefore, a step of scraping the support material with a spatula or the like was required for removal thereof. In Comparative Example 5 of the present invention corresponding to Example 2-2 described in Patent Literature 9 (JP 2012-111226 A), the curability was satisfactory. However, the viscosity of a liquid resin was as relatively high as 200 mPa·s or more at 25° C. Therefore, the operability was reduced. In addition, in Comparative Example 3, no polyfunctional unsaturated monomer was used. As a result, a crosslinked structure could not be formed sufficiently. Therefore, bleeding out of polypropylene glycol was observed significantly. As for a washing property, the support material was dispersed in deionized water in one hour and was removed. That is, the support material could be removed. However, a yellow oil-like residue was observed on a surface of a PMMA plate. That is, the support material could not be removed completely by washing with water. Therefore, it was necessary to wipe off the support material with an organic solvent such as alcohol. In addition, after removal of the support material, a washing liquid in Comparative Example 3 became clouded. Therefore, the support material could not be collected.

INDUSTRIAL APPLICABILITY

As described above, the active energy ray-curable resin composition of the present invention can be suitably used for forming a support material for addition manufacturing. In addition, the active energy ray-curable resin composition has a low viscosity and excellent operability. Therefore, this active energy ray-curable resin composition can be also used for addition manufacturing by inkjet. Furthermore, when a roughly modeled product including a three-dimensional molded product supported by the support material of the present invention is immersed in a washing liquid, the support material is dissolved, dispersed, or swollen in the washing liquid and can be easily removed. In addition, the support material has excellent separability from a curable resin composition forming a model material by including an ionic monomer. Therefore, excellent molding accuracy is exhibited. At the same time, the support material having surface active performance due to an ionic property does not adhere to a surface of the model material. Therefore, a finishing step such as wiping a surface of a molded product is unnecessary. As described above, the support material of the present invention exhibits excellent removability and can shorten a process of manufacturing a three-dimensional molded product advantageously.

The invention claimed is:

1. An active energy ray-curable resin composition for a three-dimensional molding support material, containing 1.0% by mass or more of an ionic monomer (A);
   wherein the active energy ray-curable resin composition is active energy ray-curable, and wherein the active energy ray-curable composition contains
   1.0 to 30.0% by mass of the ionic monomer (A),
   2.0 to 60.0% by mass of a non-ionic water-soluble monomer (B),
   25.0 to 80.0% by mass of a non-polymerizable compound (C), and
   0.1 to 5.0% by mass of a photopolymerization initiator (D),
   with the proviso that the composition does not contain a urethane acrylamide having a polyethylene glycol skeleton.

2. The active energy ray-curable resin composition according to claim 1, containing
   1.0 to 30.0% by mass of the ionic monomer (A),
   10.0 to 60.0% by mass of the non-ionic water-soluble monomer (B),
   25.0 to 60.0% by mass of the non-polymerizable compound (C), and
   0.1 to 5.0% by mass of the photopolymerization initiator (D),
   wherein a cured product obtained by irradiation of the active energy ray-curable resin composition with an active energy ray is water-soluble or water-dispersible.

3. The active energy ray-curable resin composition according to claim 1, containing
   1.0 to 30.0% by mass of the ionic monomer (A),
   2.0 to 50.0% by mass of a non-ionic water-soluble monomer (B),
   40.0 to 80.0% by mass of a non-polymerizable compound (C),
   0.1 to 5.0% by mass of a photopolymerization initiator (D), and
   0.5 to 5.0% by mass of a polyfunctional unsaturated monomer (E),
   wherein a cured product obtained by irradiation of the active energy ray-curable resin composition is water-swellable.

4. The active energy ray-curable resin composition according to claim 3, in which the polyfunctional unsaturated monomer (E) is polyurethane (meth)acrylamide.

5. The active energy ray-curable resin composition according to claim 1, in which the ionic monomer (A) is a cationic monomer (a1) and/or an anionic monomer (a2).

6. The active energy ray-curable resin composition according to claim 1, in which the ionic monomer (A) is a compound represented by the following General formula (1),

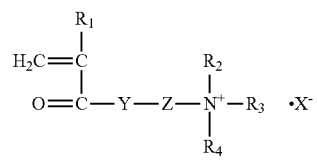

General formula (1)

wherein, in the formula,
   $R_1$ represents a hydrogen atom or a methyl group;
   $R_2$ and $R_3$ each independently represent an alkyl group having 1 to 3 carbon atoms;
   $R_2$ and $R_3$ may be the same as or different from each other;
   $R_4$ represents an alkyl group, an alkenyl group, or a benzyl group having 1 to 3 carbon atoms;
   Y represents an oxygen atom or NH;
   Z represents an alkylene group having 1 to 3 carbon atoms; and
   $X^-$ represents an anion.

7. The active energy ray-curable resin composition according to claim 1, in which the non-ionic water-soluble monomer (B) is N-substituted (meth)acrylamide.

8. The active energy ray-curable resin composition according to claim 1, in which the non-ionic water-soluble monomer (B) is N-(2-hydroxyethyl) acrylamide and/or N-acryloylmorpholine.

9. The active energy ray-curable resin composition according to claim 1, in which the non-polymerizable compound (C) is water and/or a non-polymerizable water-soluble organic compound.

10. The active energy ray-curable resin composition according to claim 1, in which the non-polymerizable compound (C) is a compound having an alkylene glycol structure.

11. An ink-jet ink composition for three-dimensional molding, containing the active energy ray-curable resin composition according to claim 1.

12. A support material obtained by curing the active energy ray-curable resin composition according to claim 1 by irradiation with an active energy ray.

13. An active energy ray-curable resin composition comprising:
   1.0 to 30.0% by mass of ionic monomer (A),
   2.0 to 60.0% by mass of a non-ionic water-soluble monomer (B),
   25.0 to 80.0% by mass of a non-polymerizable compound (C), and
   0.1 to 5.0% by mass of a photopolymerization initiator (D),
   with the proviso that the composition does not contain a urethane acrylamide having a polyethylene glycol skeleton, wherein said energy ray-curable resin composition is active energy ray-curable, and said energy ray-curable composition is substantially resistant to contamination of a shaped object when said energy ray-curable composition is used as three-dimensional support material.

* * * * *